US006487242B1

United States Patent
Thomas

(10) Patent No.: US 6,487,242 B1
(45) Date of Patent: *Nov. 26, 2002

(54) METHOD AND APPARATUS FOR VCO MODULATION IN A COMMUNICATION SYSTEM

(75) Inventor: John C. Thomas, Sunnyvale, CA (US)

(73) Assignee: VLSI Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/612,690

(22) Filed: Mar. 8, 1996

(51) Int. Cl.$^7$ ................................................ H04B 1/38
(52) U.S. Cl. ...................................... 375/222; 375/305
(58) Field of Search ................................ 375/222, 295, 375/274, 302, 305; 332/100, 101; 455/110

(56) References Cited

U.S. PATENT DOCUMENTS

| 4,843,351 | A | * | 6/1989 | Edwards et al. | ............. | 375/298 |
| 5,090,026 | A | * | 2/1992 | Stern et al. | .................. | 375/274 |
| 5,224,119 | A | * | 6/1993 | Barabash et al. | ........... | 375/295 |

FOREIGN PATENT DOCUMENTS

| CH | 595 025 | * | 1/1978 |
| EP | 0250924 A1 | * | 1/1988 |
| EP | 0417390 A2 | * | 3/1991 |
| EP | 0531100 A2 | * | 3/1993 |

OTHER PUBLICATIONS

Linz, Alfredo et al., "Efficient Implementation of an I–Q GMSK Modulator," IEEE, Jan. 1996, vol. 43, No. 1.*

* cited by examiner

Primary Examiner—Temesghen Ghebretinsae
(74) Attorney, Agent, or Firm—Hickman Coleman & Hughes, LLP

(57) ABSTRACT

A VCO modulator controller including a ROM memory storing a number of waveform maps, a counter coupled to the ROM memory and capable of developing a sequence of ROM addresses, a temporal bit generator responsive to a data stream to develop a next bit Nb, a current bit Cb, and a past bit Pb, control circuitry developing a digital waveform signal from selected waveform maps in the ROM memory using the Nb, Cb, and Pb bits and the sequence of ROM memory outputs, and a DAC that converts the digital waveform signal to an analog VCO control signal that encodes said data stream. A method for providing a modulated control voltage includes: (a) storing a number of waveform maps in a memory; (b) generating a number of temporal bits including a next bit Nb, a current bit Cb, and a past bit Pb from a data stream; (c) developing a series of addresses for the memory to create a sequence of digital outputs; (d) developing a digital waveform utilizing said Nb, Cb, and Pb bits and the sequence of digital outputs of the memory; and (e) converting the digital waveform signal to an analog VCO control signal that encodes the data stream.

24 Claims, 5 Drawing Sheets

METHOD AND APPARATUS FOR VCO MODULATION IN A COMMUNICATION SYSTEM

RELATED APPLICATIONS

This application is related to co-pending U.S. patent application Ser. No. 08/612,689 filed on Mar. 8, 1996, entitled "Method and Apparatus for Vector Modulation in a Communication System", by inventor John C. Thomas, assigned to the assignee of the present application, and which is incorporated herein by reference.

1. Technical Field

This invention relates generally to communications systems, and more particularly to voltage controlled oscillators used in communications systems.

2. Background Art

Communication systems, including land-line and wireless communication systems, are increasingly based on digital transmission technologies. This is because digital transmission technologies are capable of providing higher bandwidth, lower distortion, and lower error rates than corresponding analog technologies. A number of digital standards have been adopted, including the Cellular Digital Packet Data (CDPD) standard for cellular telephones, the Frequency Division Multiple Access (FDMA) standard for land-line telephones, etc.

In a digital communication system, such as in a digital modem, it is necessary to modulate a baseband signal to carry the desired digital information on a high-frequency radio wave carrier. This is accomplished by, for example, modulating a baseband signal which serves as an input to CDPD radio circuitry. The base band channel frequency for CDPD transmission is approximately ±15kHz, i.e. CDPD transmission has a channel bandwidth of about 30 kHz.

Several prior art modulating methods utilize an algorithm known as Gaussian Minimum Shift Keying (GMSK) waveform synthesis. The use of GMSK waveform synthesis for vector modulation using a finite state machine and a waveform stored in read-only memory (ROM) is known. With such a system, a ROM is used to store sine and cosine values for the phase angles of a rotating phasor. The closest phase angle is determined, and the sine and cosine is read from the ROM to create a pair of control signals for a vector modulated radio transmitter.

A problem with the prior art GMSK waveform synthesis methods is that very large ROMs are required, increasing the size and cost of the circuitry. This is because many sine and cosine values are often required to obtain the desired resolution. In addition, the determination of the phase angle tends to be computationally intensive, and therefore slow and expensive. More particularly, prior GMSK baseband vector modulation systems have been burdened with relatively complex mathematical operations and large amounts of ROM necessary, for example, to map a digitized rotating phasor, rotating with variable angular velocity, into a Cartesian coordinate system. In addition, an accumulator is required in the prior art to store the current phase angle. The known literature is silent as to the use of GMSK techniques for certain other modulation technologies, such as a voltage controlled oscillator (VCO) modulation.

A problem inherent in prior art vector modulation systems is obtaining a faithful reproduction of the waveforms stored in ROM. This is because only a finite number of increments of sine and cosine values can be stored in the ROMs.

Therefore, there is an inherent trade-off between ROM size and resolution in prior art vector modulation systems.

DISCLOSURE OF THE INVENTION

The present invention utilizes the symmetries present in the baseband control signal to a VCO to reduce the mathematical complexity and the amount of ROM to generate a VCO modulated waveform. The present invention therefore allows for less complex (and therefore less expensive and more reliable) finite state machines and for less ROM to be used than was possible in the prior art. Using less ROM has the desirable effect of reducing part size and increasing memory access speed. Furthermore, a faithful reproduction of the waveforms stored in ROM is accomplished by allowing only those digital values in the ROM which are closest (in a digital sense) to the actual modulated waveforms, effectively providing a finer resolution for the waveform. Also, by utilizing GMSK techniques with VCO modulation, a less expensive and less complex alternative for vector modulation is provided.

A radio modem in accordance with the present invention includes a VCO controller receptive to a data stream, where the VCO controller develops a VCO control signal by GMSK waveform synthesis. The radio modem also includes a transmitter having a VCO portion having an input responsive to said GMSK waveform synthesized VCO control signal, such that the transmitter can develop a modulated RF signal carrying the data stream.

A VCO modulator controller of the present invention includes ROM memory storing a number of waveform maps, and a counter coupled to the ROM memory and capable of developing a sequence of ROM addresses. The controller also includes a temporal bit generator responsive to a data stream to develop a next bit Nb, a current bit Cb, and a past bit Pb. Control circuitry of the controller develops a digital waveform signal from selected waveform maps in the ROM memory using the Nb, Cb, and Pb bits and the sequence of ROM memory outputs. Finally, a DAC converts the digital waveform signal to an analog VCO control signal that encodes said data stream.

A method for providing a modulated control voltage in accordance with the present invention comprises the steps of: (a) storing a number of waveform maps in a memory; (b) generating a number of temporal bits including a next bit Nb, a current bit Cb, and a past bit Pb from a data stream; (c) developing a series of addresses for the memory to create a sequence of digital outputs; (d) developing a digital waveform utilizing said Nb, Cb, and Pb bits and the sequence of digital outputs of said memory; and (e) converting the digital waveform signal to an analog VCO control signal that encodes said data stream.

The present invention provides a modulated baseband signal for a digital communication system in a fashion that is less computationally intensive and one which requires less memory than similar circuits of the prior art. This is because the large ROMs and the accumulators of the prior art are not required. ROM size is reduced by utilizing the inherent symmetry in the stored waveforms. In addition, the present invention obtains a faithful reproduction of the waveforms stored in the ROM by storing data with a finer resolution (made possible by eliminating symmetrically redundant data), resulting in less distortion to the transmitted signals.

The present invention is also advantageous in that GMSK techniques are being used for voltage controlled oscillator (VCO) modulation of a carrier signal. This VCO modulation is less expensive than vector modulation techniques, and therefore is a viable substitute for low-end applications.

These and other advantages of the present invention will become apparent upon reading the following detailed descriptions and studying the various figures of the drawings.

BEST MODES FOR CARRYING OUT THE INVENTION

Figure 1:
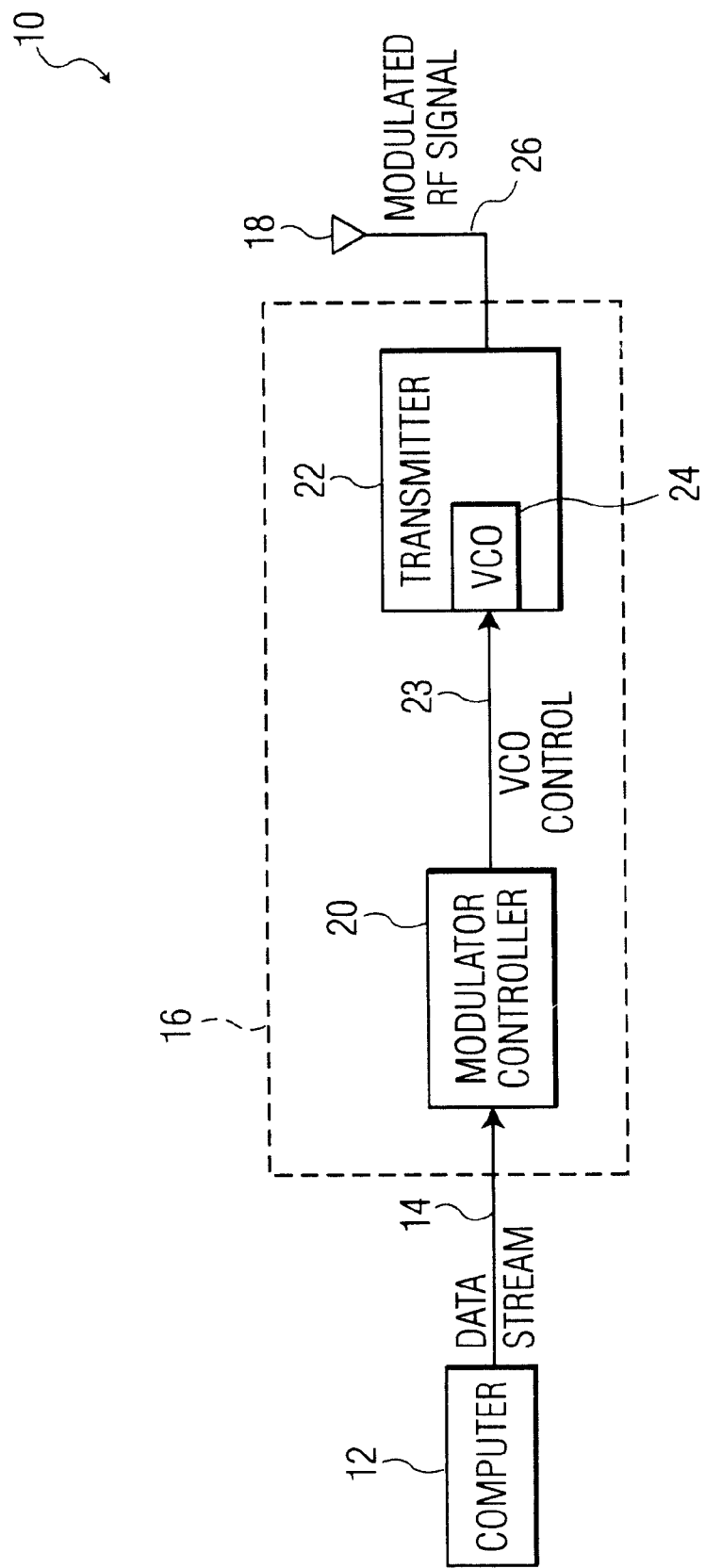
FIG. 1 is a block diagram of a digital communication system using a modulator controller of the present invention.

A digital communication system 10 in accordance with the present invention includes a computer 12 creating a data stream 14. The present invention also includes a radio modem 16 that is responsive to the data stream 14 and which is operative to transmit the data stream via a transmitting antenna 18. Radio modems are often referred to as "Mobile End Systems" or "MES." Currently, the CDPD transmission data rate for an MES is about 19.2 kilobits/second ("baud"). Thus, the present invention is concerned with the transmission of digital information, preferably over a wireless communication channel, such as a cellular telephone system.

The computer 12 can be any suitable digital processing system, such as a personal computer. It is often desirable to be able to transmit serial data as a "data stream" to other computer systems. To accomplish this task, a radio modem, such as the radio modem 16 of the present invention, can be used.

Radio modem 16 includes a modulator controller 20 and a transmitter 22. In the present invention, the transmitter 22 has, as an input, a voltage controlled oscillator (VCO) portion 24 which allows the modulation of a high frequency carrier signal with the digital information in the data stream 14. The design and manufacture of transmitters, such as transmitter 22, with VCO modulators, is well known to those skilled in the art.

As mentioned previously, the modulator controller 20 of the present invention, receives, as an input, the data stream 14 from computer 12. The modulator produces a VCO control signal 23 which serves as a control input to the VCO portion 24 of the transmitter 22. The VCO control signal 23 causes a modulation of a high frequency carrier signal to provide a modulated radio frequency (RF) signal 26 which radiates from antenna 16. For cellular systems, the high frequency carrier signal has a frequency of about 900 MHz, and the modulation of the high frequency carrier signal is approximately ±4.8 kHz.

In operation, the computer 12 implements a connection with a receiving modem of a remote computer system (not shown). The computer 12 then sends ("transmits") the data stream 14 to the modulator controller 20 of the radio modem 16 which develops the VCO control 23, thereby causing the VCO portion 24 to modulate the high frequency radio signal generated by transmitter 22 to create the modulated RF signal 26. This modulated RF signal 26 is transmitted to the remote computer via the antenna 18.

The computer 12, transmitter 22 (including VCO portion 24), antenna 18, and cellular system described previously are all conventional systems well known to those skilled in the art. The present invention is directed to an improved VCO modulator controller 20, which forms a portion of an improved radio modem 16, which forms a portion of an improved communication systems 10. It should be noted that the present invention is directed to the transmission of digital data, not the reception of such data, which is handled by other circuitry well known to those skilled in the art.

Figure 2:
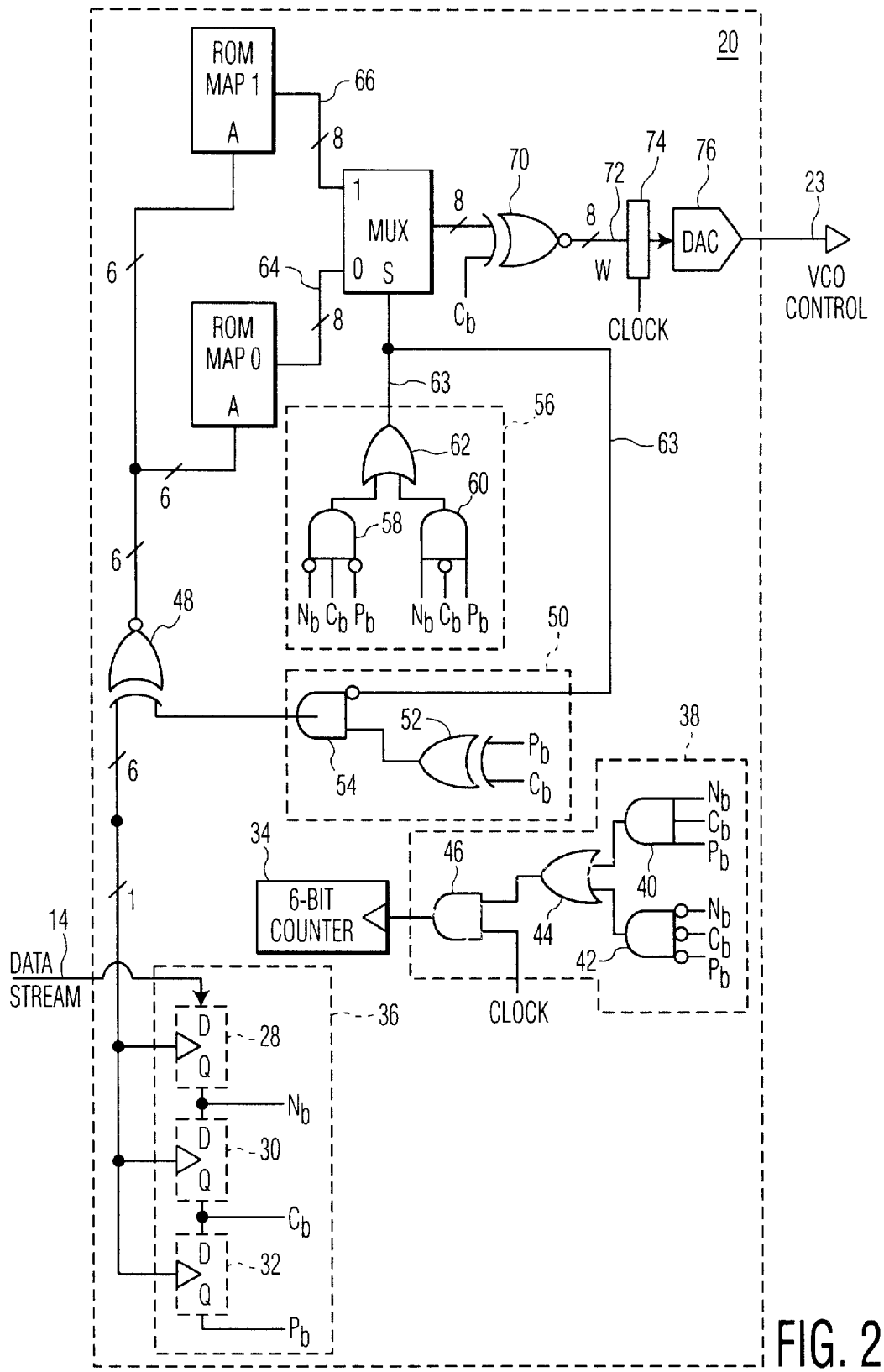
FIG. 2 is a schematic diagram of a modulator controller of FIG. 1.

In FIG. 2, a modulator controller 20 in accordance with the present invention has, as an input, the data stream 14. The data stream 14 is fed into a series of three flip-flops 28, 30, and 32. More particularly, the data stream 14 is fed into the D input of flip-flop 28, the Q output of flip-flop 28 is coupled to the D input of flip-flop 30, and the Q output of flip-flop 30 is coupled to the D input of flip-flop 32. The flip-flops 28, 30, and 32 are clocked, in parallel, by the most significant bit (MSB) of a 6-bit counter 34. The Q output of flip-flop 28 creates the next bit Nb, the Q output of flip-flop 30 creates the current bit Cb, and the Q output of flip-flop 32 produces the past bit Pb. The purpose of use of the bits Nb, Cb, and Pb will become apparent in the following discussion. Cumulatively, the flip-flops 28–32 comprise a temporal bit generator 36.

The outputs of the temporal bit generator 36 are coupled, inter alia, to a clocking circuit 38. The clocking circuit 38 has, as inputs, a system clock CLOCK and the 3 bits Nb, Cb, and Pb. More particularly, the clocking circuit 38 includes a 3-input AND gate 40, a 3-input inverting AND gate 42, an inverting OR gate 44, and an AND gate 46. The bits Nb, Cb, and Pb are coupled to the three non-inverting inputs of AND gate 40, and to the three inverting inputs to AND gate 42. The outputs of AND gates 40 and 42 are combined in a NOR gate 44, the output of which is combined with the clock signal in AND gate 46. The effect of the gates 40–44 are to produce a zero ("0" or "low" or "LO") output from NOR gate 44 if the bits Nb, Cb, and Pb indicate that there is a "constant map." The significance of a constant map will be discussed subsequently. However, when a constant map is detected with the gates 40–44, the effect is to create a LO at the output of AND gate 46, thereby stopping the clock.

When a constant map is not detected by the gates 40–44, the output of NOR gate 44 is one ("1" or "high" or "HI"), and the output of AND gate 46 will be the clock signal CLOCK. This serves as the clocking input to the 6-bit counter 34. The 6th bit (i.e. the MSB) of the 6-bit counter is used, as discussed previously, to clock the temporal bit generator 36. The 6th bit of the 6-bit counter is input into a 7-bit exclusive NOR (XNOR) gate 48. The 7th bit of the XNOR gate 48 is developed by address direction circuitry 50 comprising an exclusive OR (XOR) gate 52 and an AND gate 54. The address direction generator 50 is responsive to the bits Pb and Cb, and to the output of an alternating map detector 56. More particularly, the bits Pb and Cb are inputs to the XOR gate 52, and the output of the XOR gate 52 and the output of the alternating map detector 56 are input to an AND gate 54. The input to the AND gate 54 that is coupled to the output of alternating map detector 56 is inverted. The output of the AND gate 54 is the 7th input to the XNOR gate 48. Essentially, the gates perform a 1's complement, causing the 6-bit address bus at the output of XNOR 48 to either count up or to count down. An up count will provide the maps below the axis 88 of FIG. 3, and a down count will provide the maps above the axis 88 of FIG. 3. In this manner, only one set of maps needs to be stored in ROM, as the other set of maps can be generated due to their symmetry around the axis 88.

The map selector 56 is used to select among the maps output from the MAP 0 ROM and the MAP 1 ROM. More particularly, the map selector 56 includes two AND gates 58 and 60, and OR gate 62. The bit Nb is coupled to an inverting input to OR gate 58, the bit Cb is coupled to a non-inverting input of AND gate 58, and the bit Pb is coupled to an inverting input of AND gate 58. The bit Nb is coupled to a non-inverting input of AND gate 60, the bit Cb is coupled to an inverting input of AND gate 60, and the bit Pb is coupled to a non-inverting input of AND gate 60. The outputs of AND gates 58 and 60 are combined in OR gate 62 to create a map selector signal on a line 63, which is one of the inputs into AND gate 54.

A 6-bit output of XNOR gate 48 corresponding to the output of the 6-bit counter is then input as the address into a first ROM Map 0, and second ROM Map 1. The data corresponding to the address signals at the address inputs to Map 0 and Map 1 are output on busses 64 and 66, respectively. The busses 64 and 66 are input to a multiplexer (MUX) 68 which select between the Map 0 output and the Map 1 output of the signal on line 64. The 8-bit output of the MUX 68 is then combined with the bit Cb in an XNOR gate 70 to produce an output on a bus 72. The bus 72 feeds into an 8-bit latch 74 which is clocked by the system clock CLOCK. The output of the 8-bit latch 74 is fed into a digital-to-analog converter (DAC) 76 which produces the desired VCO control signal 23. The latch 74 ensures that all of the bits being fed into the DAC 76 are stable, i.e. that the data is not unstable due to "race" conditions. The DAC 76 is preferably a "true" 8-bit DAC linear within ½ of a least significant bit (LSB).

Figure 2A:
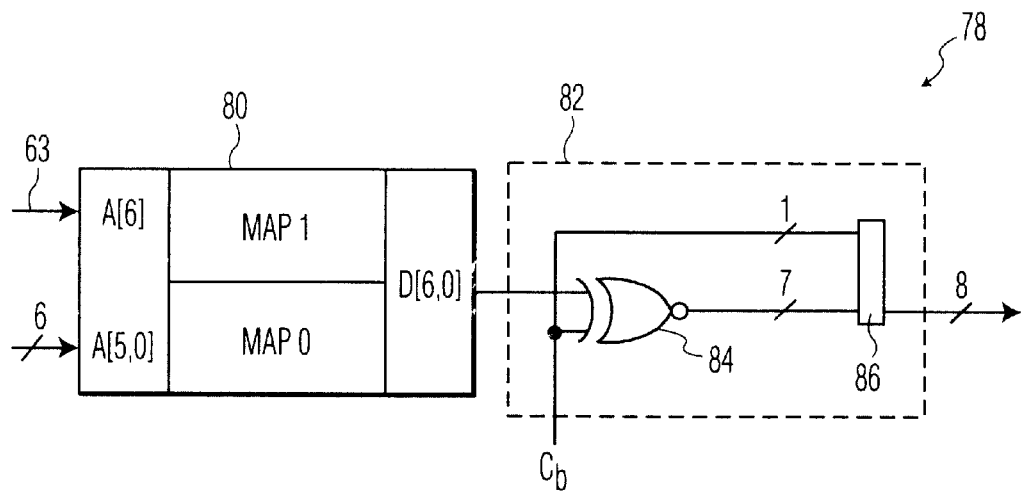
FIG. 2a is a block diagram of an alternative ROM circuit of FIG. 2.

FIG. 2a is an alternate representation for the ROM of the modulator controller 20 illustrated in FIG. 2. While the two ROM and MUX 68 approach is intuitive, it has the disadvantage of requiring two, separate ROMs and a separate multiplexer device. Therefore, a preferred alternative ROM circuit 78 includes a single ROM 80 and output circuitry 82. The ROM 80 can, for example, be 128 words long, where each word of the ROM is seven bits wide.

With the alternative ROM circuit 78 of FIG. 2a, the components "ROM Map 0," "ROM Map 1," MUX 68, XNOR 70, and latch 74 of FIG. 2 are replaced by the ROM 80 and output circuitry 82. Within ROM 80, Map 0 has been stored within low memory, and Map 1 has been stored within high memory. The map selector signal on line 63 switches between low memory and high memory by being coupled to address bit 7 (i.e. to A[6]). The output of the XNOR gate 48 of FIG. 2, i.e. (the six-bit address bus), is coupled to the lower six address bits of ROM 80 (i.e. to A[5:0]). The address bus therefore addresses the bytes within the selected Map 0 or Map 1.

The output of ROM 80, namely data bits D[6:0], are coupled to an input of XNOR gate 84. Coupled to another input of XNOR gate 84 is the current bit Cb. The seven bit output of XNOR gate 84, corresponding to the data bits D[6:01], is combined with the current bit Cb in a latch 86 to create the 8-bit output that feeds into DAC 76 of FIG. 2. In this fashion, a single ROM can be used to contain both Map 0 and Map 1, thereby lowering the cost and the reducing size of the circuitry In FIG. 3, a graphical representation of Map 0 and Map 1 is provided. In the graph, the representation of a single "bit" is shown, where a bit comprises 16 cycles of the system clock CLOCK. Along the X-axis are the address locations from 0–15 (0-F hexadecimal) and along the Y-axis are the stored values ranging from 00 to FF hexadecimal. It should be noted that the graph creates a well-known "eye" diagram which is symmetrical around a horizontal axis 88. It is therefore only necessary to store the maps either above the axis 88 or below the axis 88, as the other maps can be generated due to this symmetry. In the present invention, the values stored in ROM 80 are taken from below the axis 88 since this permits the use of only 7 data bits, rather than the 8 required if the maps above axis 88 were used.

Figure 3:
FIG. 3 is an illustration of a map stored in ROM memory of the modulator controller of FIG. 2.
Figure 3:
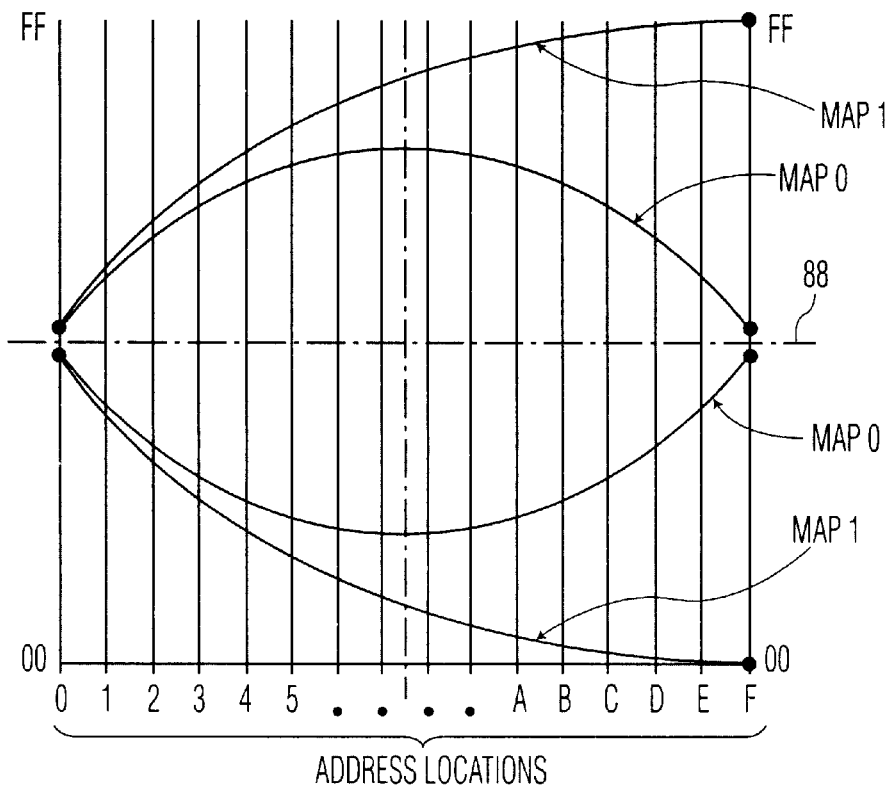

These CDPD GMSK waveforms illustrated in FIG. 3 show an "alternating" Map 0, and a "monotonic" Map 1. There is also a constant map which does not need to be stored in ROM since it corresponds to a constant stream of zeros or ones. It is well known to those skilled in the art how to generate GMSK waveforms, such as the GMSK waveforms of FIG. 3.

Figure 4:
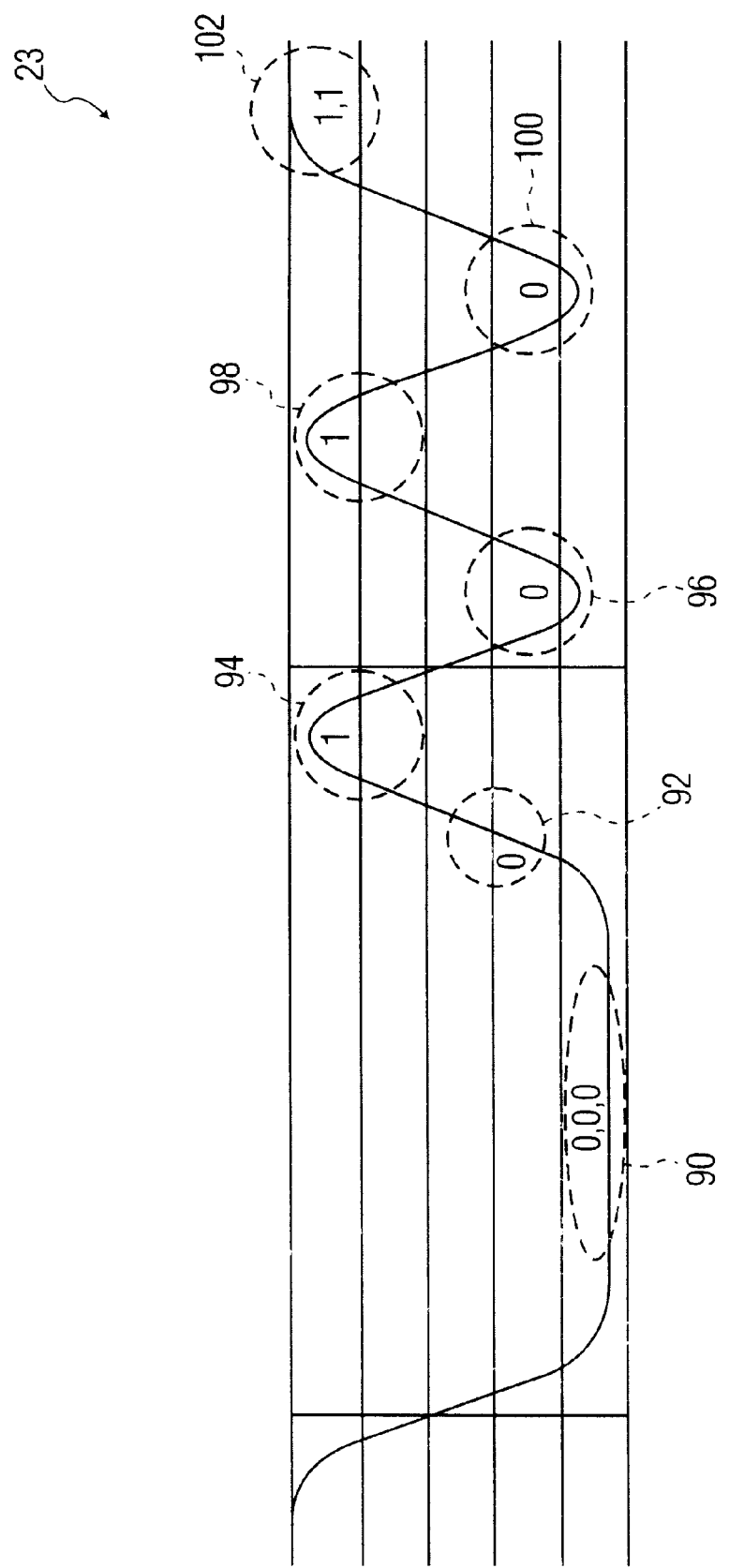
FIG. 4 is a waveform illustrating an exemplary VCO control signal provided by the modulator controller of the present invention.

FIG. 4 is a graph showing an exemplary VCO control signal 23. Illustrated in a section 90 is a constant map corresponding to a stopped clock signal. This corresponds to a series of zeros being sent, and is detected by the clocking circuit 38. When a string of zeros are being transmitted, the 6-bit counter 34 is no longer being clocked and the VCO control signal 23 obtains a constant low state. In a section 92, a "001" is being transmitted, which corresponds to monatomic Map 1. In a section 94, a "010" is being sent corresponding to the alternating Map 0 in section 96, a "101" is being sent corresponding to alternating Map 0 in a section 98, another 010 is being sent corresponding to Map 0. Another 101 is sent in section 100 corresponding to alternating Map 0, and a "011" is sent in a section 102 corresponding to monatomic Map 1.

The data bits encoded by the various sections of signal 23 are, obviously, the current bit Cb. Therefore, in section 90, a series of zeros are being sent, and a zero is also being sent in section 92. A one is being sent in section 94, and a zero is being sent in section 96. Another one is being sent in section 94, followed by a zero in section 96, a one in section 98, and a zero in section 100. A series of ones are being sent starting in section 102.

Figure 5:
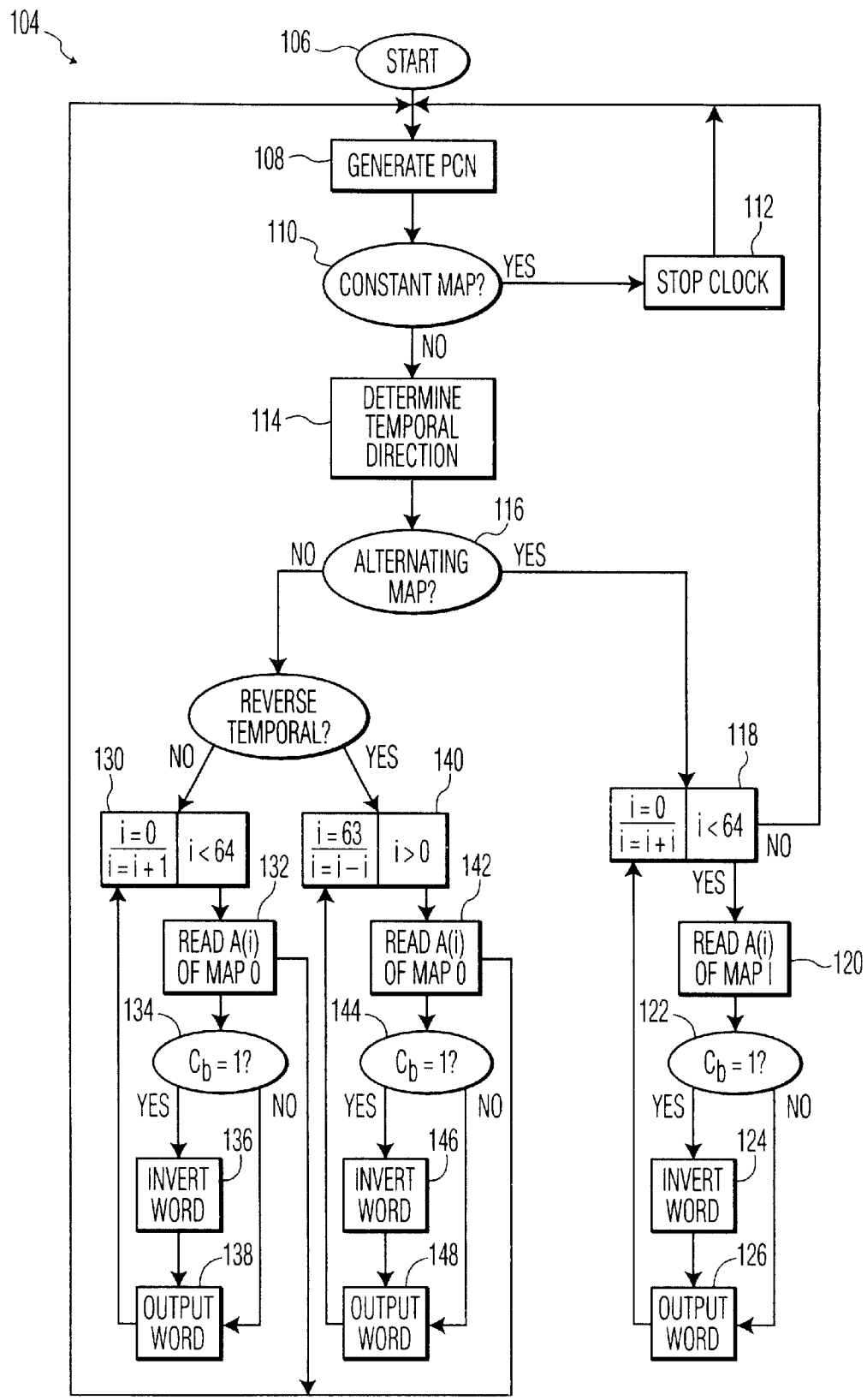
FIG. 5 is a flow diagram of a process for digital communication in accordance with the present invention.

In FIG. 5, a process 104 for digital communication in accordance with the present invention is shown in the form of a process flow diagram. The process begins as indicated at 106 and, in a step 108, the "PCN" is generated, i.e. the Pb, Cb, and Nb bits are generated. This step can be performed by the temporal bit generator 36 of FIG. 2. Next, in a step 110, it is determined if the PCN bits correspond to a constant map. If it is a constant map, the clock is stopped in step 112 and process control is returned to step 108. Steps 110 and 112 can be performed by the clocking circuit 38. Next, the temporal direction is determined in a step 114, such as with gates 52 and 54 of FIG. 2. A step 116 determines if the map is an alternating map, such as with the circuitry of the alternating map detector 56.

If step 116 determines that it is an alternating map, an iterative loop 118 is initiated to read out 64 (in this preferred embodiment) words of the alternating map from the ROM Map 1. In a step 120, a word A(i) is read from ROM Map 1, and then it is determined if Cb=1 in a step 122, i.e. whether the word should be inverted. If Cb=1, the word is inverted in a step 124 (such as within the gate 70), and the word is output in a step 126(such as to the DAC 76). If Cb =0, the word is simply output. Process control is then returned to the iterative loop 118 for an iteration of the counter i, until the value of i reaches 64, at which time process control returns to step 108. This counting of the iterative loop is performed by providing 64 read cycles to the ROM memory.

If step 116 determines that the PCN does not describe an alternating map (i.e. it is a monotonic map), a decision is made in step 128 as to whether the temporal sense is to be reversed. This decision is implemented by, for example, gate 48 of FIG. 2. If the temporal sense is not to be reversed, an iterative loop 130 is initiated to read out 64 (in this preferred embodiment) words of the monotonic map from the ROM Map 0. In a step 132, a word A(i) is read from ROM Map 0, and then it is determined if Cb=1 in a step 134, i.e. whether the word should be inverted. If Cb=1, the word is inverted in a step 136 (such as within the gate 70), and the word is output in a step 138 (such as to the DAC 76). If Cb=0, the word is simply output. Process control is then returned to the iterative loop 130 for an iteration of the counter i, until the value of i reaches 64, at which time process control returns to step 108. This counting of the iterative loop is performed by providing 64 read cycles to the ROM memory.

If step 128 determines that temporal sense is not to be reversed, an iterative loop 140 is initiated to read out 64 (in this preferred embodiment) words of the alternating map from the ROM Map 0 in reverse order to reverse the temporal sense. This loop 140 begins at i=63 and counts down to i=0. In a step 142, a word A(i) is read from ROM Map 0, and then it is determined if Cb=1 in a step 144, i.e. whether the word should be inverted. If Cb=1, the word is inverted in a step 144 (such as within the gate 70), and the word is output in a step 148 (such as to the DAC 76). If Cb=0, the word is simply output. Process control is then returned to the iterative loop 140 for a negative iteration of the counter i, until the value of i reaches −1, at which time process control returns to step 108. This counting of the iterative loop is performed by providing 64 read cycles to the ROM memory, with the temporal sense being reverse in, for example, gate 48 by taking the 1's complement of the address.

While this invention has been described in terms of several preferred embodiments, there are alterations, permutations, and equivalents which fall within the scope of this invention. It should also be noted that there are may alternative ways of implementing both the process and apparatus of the present invention. It is therefore intended that the following appended claims be interpreted as including all such alterations, permutations, and equivalents as fall within the true spirit and scope of the present invention.

I claim:

1. A communications system comprising:
   a computer developing a data stream for transmission;
   a radio modem comprising:
      a) a VCO controller coupled to said computer to receive said data stream, said VCO controller developing a VCO control signal by GMSK waveform synthesis, wherein said VCO controller includes:
         ROM memory storing a plurality of waveform maps;
         a counter coupled to said ROM memory and capable of developing a sequence of ROM addresses to provide a sequence of ROM memory outputs;
         a temporal bit generator responsive to said data stream, said temporal bit generator developing a next bit Nb, a current bit Cb, and a past bit Pb from said data stream;
         control circuitry to develop a digital waveform signal from a selected waveform map in said ROM memory, said control circuitry being responsive to said Nb, Cb, and Pb bits and said sequence of ROM memory outputs; and
         a DAC responsive to said digital waveform signal and operative to output said VCO control signal that encodes said data stream; and
      b) a transmitter having a VCO portion, said VCO portion having an input responsive to said VCO control signal, said transmitter developing a modulated RF signal carrying said data stream in response to said VCO control signal; and
   an antenna coupled to said transmitter of said radio modem for transmission of said modulated RF signal.

2. The communications system as recited in claim 1, wherein said plurality of maps are stored in said ROM memory in a minimalistic fashion taking advantage of symmetry in said maps.

3. The communications system as recited in claim 2 wherein said plurality of waveform maps comprises one-half of an alternating map and one-half of a monotonic map, where the other one-half of said alternating map and the other one-half of said monotonic map can be generated due to the symmetry of said maps.

4. A radio modem comprising:
   a VCO controller receptive to a data stream, said VCO controller developing a VCO control signal by GMSK waveform synthesis, wherein said VCO controller includes:
      ROM memory storing a plurality of waveform mass;
      a counter coupled to said ROM memory and capable of developing a sequence of ROM addresses to provide a sequence of ROM memory outputs;
      a temporal bit generator responsive to said data stream, said temporal bit generator developing a next bit Nb, a current bit Cb, and a past bit Pb from said data stream;
      control circuitry to develop a digital waveform signal from a selected waveform map in said ROM memory, said control circuitry being responsive to said Nb, Cb, and Pb bits and said sequence of ROM memory outputs; and
      a DAC responsive to said digital waveform signal and operative to output said VCO control signal that encodes said data stream; and
   a transmitter having a VCO portion, said VCO portion having an input responsive to said VCO control signal, said transmitter developing a modulated RF signal carrying said data stream in response to said VCO control signal.

5. The communications system as recited in claim 4, wherein said plurality of maps are stored in said ROM memory in a minimalistic fashion taking advantage of symmetry in said maps.

6. The communications system as recited in claim 5 wherein said plurality of waveform maps comprises one-half of an alternating map and one-half of a monotonic map, where the other one-half of said alternating map and the other one-half of said monotonic map can be generated due to the symmetry of said maps.

7. A VCO modulator controller comprising:
   ROM memory storing a plurality of waveform maps;
   a counter coupled to said ROM memory and capable of developing a sequence of ROM addresses to provide a sequence of ROM memory outputs;
   a temporal bit generator responsive to a data stream, said temporal bit generator developing a next bit Nb, a current bit Cb, and a past bit Pb from said data stream;
   control circuitry to develop a digital waveform signal from a selected waveform map in said ROM memory, said control circuitry being responsive to said Nb, Cb, and Pb bits and said sequence of ROM memory outputs; and a DAC responsive to said digital waveform signal and operative to output a VCO control signal that encodes said data stream.

8. The VCO modulator controller as recited in claim 7, wherein said ROM memory comprises a separate ROM memory for each waveform map.

9. The VCO modulator controller as recited in claim 7 wherein said ROM memory comprises a single ROM memory for all of said waveform maps.

10. The VCO modulator controller as recited in claim 7 wherein said plurality of waveform maps comprises at least a portion of an alternating map and a monotonic map.

11. The VCO modulator controller as recited in claim 10 wherein said plurality of maps are stored in said ROM memory in a minimalistic fashion taking advantage of symmetry in said maps.

12. The VCO modulator controller as recited in claim 11 wherein said plurality of waveform maps comprises one-half of an alternating map and one-half of a monotonic map, where the other one-half of said alternating map and the other one-half of said monotonic map can be generated due to the symmetry of said maps.

13. A VCO modulator controller comprising:

storing means for storing a plurality of waveform maps;

generating means for generating a plurality of temporal bits including a next bit Nb, a current bit Cb, and a past bit Pb from a data stream;

addressing means for developing a series of addresses for said storing means to create a sequence of digital outputs from said storing means;

developing means for developing a digital waveform signal from a selected waveform map of said storing means, said means for developing being responsive to said Nb, Cb, and Pb bits and said sequence of digital outputs of said storage means; and conversion means responsive to said digital waveform signal and operative to develop an analog VCO control signal that encodes said data stream.

14. The VCO modulator controller as recited in claim 13 wherein said storing means includes a separate ROM for each waveform map.

15. The VCO modulator controller as recited in claim 13 wherein said storing means includes a single ROM memory for all of said waveform maps.

16. The VCO modulator controller as recited in claim 15 wherein said plurality of waveform maps comprises at least a portion of an alternating map and a monotonic map.

17. The VCO modulator controller as recited in claim 16 wherein said plurality of maps are stored in said ROM memory in a minimalistic fashion taking advantage of symmetry in said maps.

18. The VCO modulator controller as recited in claim 17 wherein said plurality of waveform maps comprises one-half of an alternating map and one-half of a monotonic map, where the other one-half of said alternating map and the other one-half of said monotonic of said generated due to the symmetry of said maps.

19. A method for providing a modulated control voltage comprising the steps of:

storing a plurality of waveform maps in a memory;

generating a plurality of temporal bits including a next bit Nb, a current bit Cb, and a past bit Pb from a data stream;

developing a series of addresses for said memory to create a sequence of digital outputs;

developing a digital waveform signal utilizing said Nb, Cb, and Pb bits and said sequence of digital outputs of said memory; and converting said digital waveform signal to an analog VCO control signal that encodes said data stream.

20. The method for providing a modulated control voltage as recited in claim 19 wherein said step of storing a plurality of waveform maps comprises:

generating a monotonic map and an alternating map; and storing at least portions of said monotonic map and said alternating map in ROM.

21. The method for providing a modulated control voltage as recited in claim 20 wherein said steps of generating and storing results in the storage of one-half of a monotonic map and one-half of an alternating map, such that the other one-half of said monotonic map and the other one-half of said alternating map can be generated using inherent symmetries in the waveforms.

22. A method for making a communications system comprising the steps of:

providing a ROM memory on a semiconductor substrate that stores a plurality of waveform maps;

providing a counter on said substrate that is coupled to said ROM memory and which is capable of developing a sequence of ROM addresses to provide a sequence of ROM memory outputs;

providing a temporal bit generator on said substrate that is responsive to a data stream, said temporal bit generator developing a next bit Nb, a current bit Cb, and a past bit Pb from said data stream;

providing control circuitry on said substrate to develop a digital waveform signal from a selected waveform map in said ROM memory, said control circuitry being responsive to said Nb, Cb, and Pb bits and said sequence of ROM memory outputs; and providing a DAC on said substrate that is responsive to said digital waveform signal and operative to output a VCO control signal that encodes said data stream.

23. The method for making a communications system as recited in claim 22 further comprising the step of:

providing a transmitter having a VCO portion responsive to said VCO control signal, said transmitter developing a modulated RF signal for wireless transmission of said data stream.

24. The method for making a communications system as recited in claim 23 further comprising the step of:

coupling a computer providing said data stream to said temporal bit generator; and coupling an antenna to said transmitter to aid in the wireless transmission of said data stream.

* * * * *